United States Patent
Patro et al.

(10) Patent No.: US 8,401,937 B1
(45) Date of Patent: *Mar. 19, 2013

(54) SYSTEM, METHOD, AND COMPUTER PROGRAM PRODUCT FOR IDENTIFYING AN OPTIMIZED RATING SCHEME

(75) Inventors: Debabrata Patro, Pune (IN); Menachem Domb, Ramat Gan (IL)

(73) Assignee: Amdocs Software Systems Limited, Dublin (IE)

( * ) Notice: Subject to any disclaimer, the term of this patent is extended or adjusted under 35 U.S.C. 154(b) by 825 days.

This patent is subject to a terminal disclaimer.

(21) Appl. No.: 12/013,991

(22) Filed: Jan. 14, 2008

(51) Int. Cl.
  *G07F 19/00* (2006.01)
  *G06F 15/02* (2006.01)
  *G06Q 40/00* (2006.01)
  *H04M 15/00* (2006.01)

(52) U.S. Cl. ......... 705/34; 705/32; 705/40; 379/114.03; 379/121.02; 379/127.05

(58) Field of Classification Search .................. None
See application file for complete search history.

(56) References Cited

U.S. PATENT DOCUMENTS 6,205,211 B1 * 3/2001 Thomas et al. .......... 379/114.06
2007/0281663 A1 * 12/2007 Sandholm et al. ............ 455/406

FOREIGN PATENT DOCUMENTS

WO  WO 01/75549  10/2001

* cited by examiner

*Primary Examiner* — Fahd Obeid
(74) *Attorney, Agent, or Firm* — Zilka-Kotab, PC (57) ABSTRACT

A system, method, and computer program product are provided for identifying an optimized rating scheme. In use, a first rate calculated for an event utilizing a first predefined rating scheme is received. Additionally, at least one second rate for the event is calculated, utilizing at least one second predefined rating scheme. Further, an optimized rating scheme is identified by comparing the first rate and the at least one second rate.

22 Claims, 7 Drawing Sheets

RATING SCHEMES

| NAME | USAGE RAGE | RECURRING CHARGE | ALLOWANCE | PRIORITY |
|---|---|---|---|---|
| RATING SCHEME_01 | $.01/MIN FOR LOCAL $.02/MIN FOR LONG DISTANCE | $10 | 50 MINUTES | 1 |
| RATING SCHEME_02 | $.05/MIN FOR FRIENDS & FAMILY, $.01/MIN FOR LOCAL, $.02/MIN FOR LONG DISTANCE | $15 | 50 MINUTES | 2 |
| RATING SCHEME_03 | $.07/MIN FOR LOCAL $.10/MIN FOR LONG DISTANCE | $20 | 100 MINUTES | 3 |

FIGURE 7

SYSTEM, METHOD, AND COMPUTER PROGRAM PRODUCT FOR IDENTIFYING AN OPTIMIZED RATING SCHEME

FIELD OF THE INVENTION

The present invention relates to events ratings, and more particularly to calculating event ratings.

BACKGROUND

Traditionally, events have been rated for various purposes. Oftentimes, event ratings are used for billing for such events. For example, an event rating may indicate an price to be billed for the event. Customarily, event ratings have been calculated based on rate plans associated with users generating the events. However, conventional techniques for selecting rate plans have generally exhibited various limitations.

Just by way of example, a rate plan is sometimes usually selected by the user generating the events being rated. Applications may also be utilized for manually selecting rate plans for users. Unfortunately, the manual selection and automatic selection processes have generally been based on projected events and/or historical events, both of which may provide non-optimized rating (e.g. charging) of events. In addition, the manual selection and automatic selection processes many times fail to consider every detail associated with selecting the rate plan.

There is thus a need for addressing these and/or other issues associated with the prior art.

SUMMARY

A system, method, and computer program product are provided for identifying an optimized rating scheme. In use, a first rate calculated for an event utilizing a first predefined rating scheme is received. Additionally, at least one second rate for the event is calculated, utilizing at least one second predefined rating scheme. Further, an optimized rating scheme is identified by comparing the first rate and the at least one second rate.

DETAILED DESCRIPTION

Figure 1:
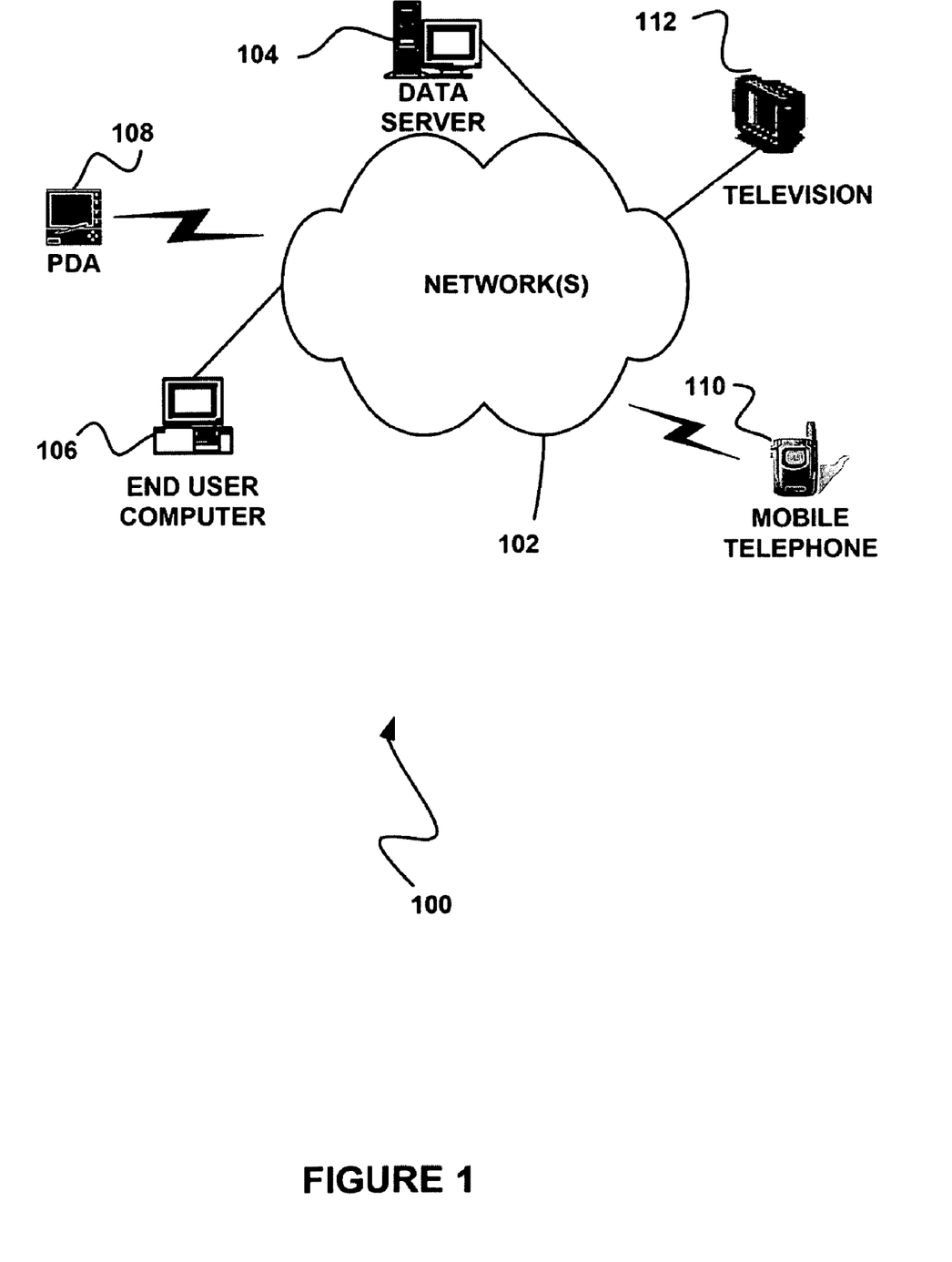
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
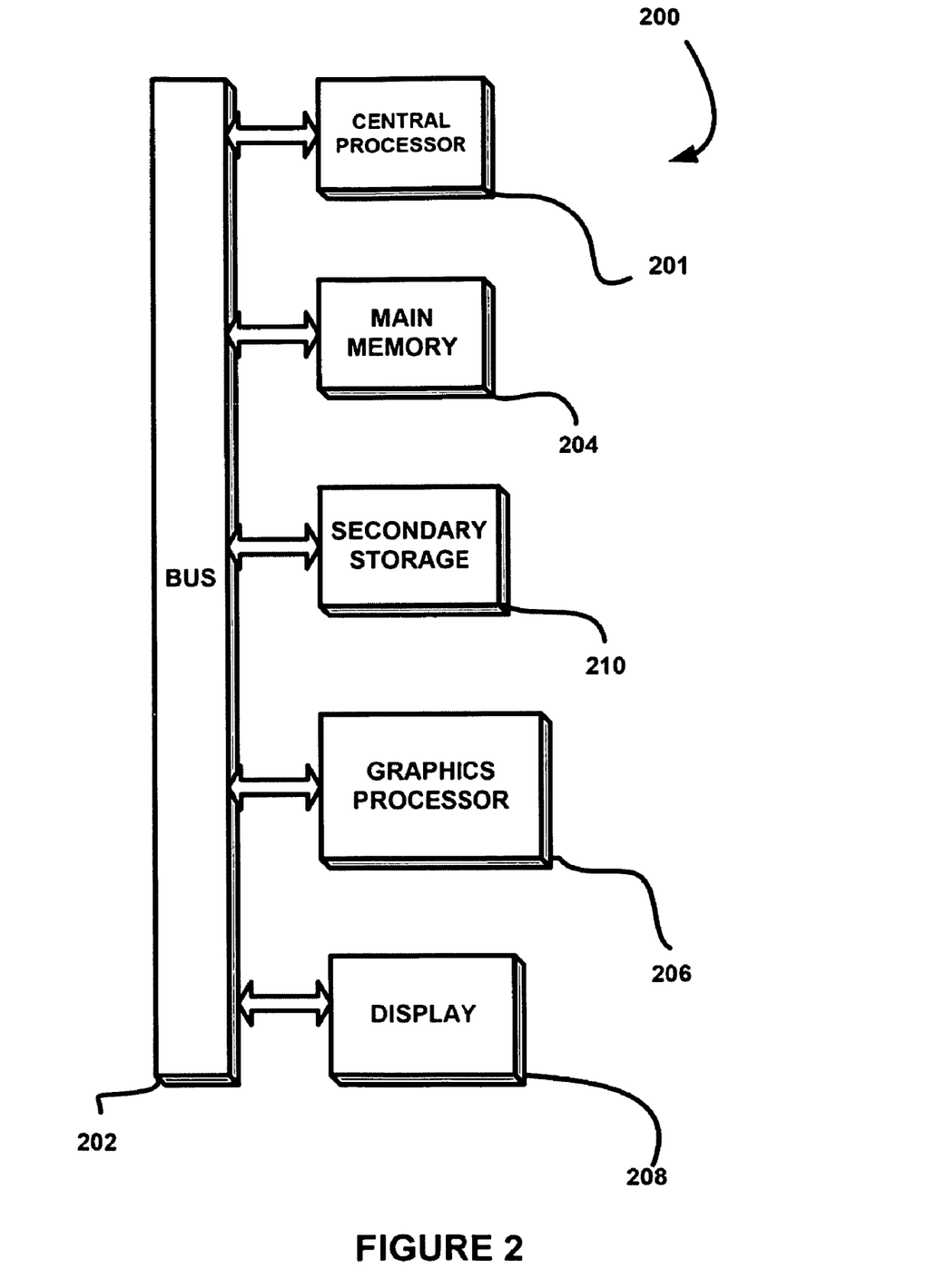
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
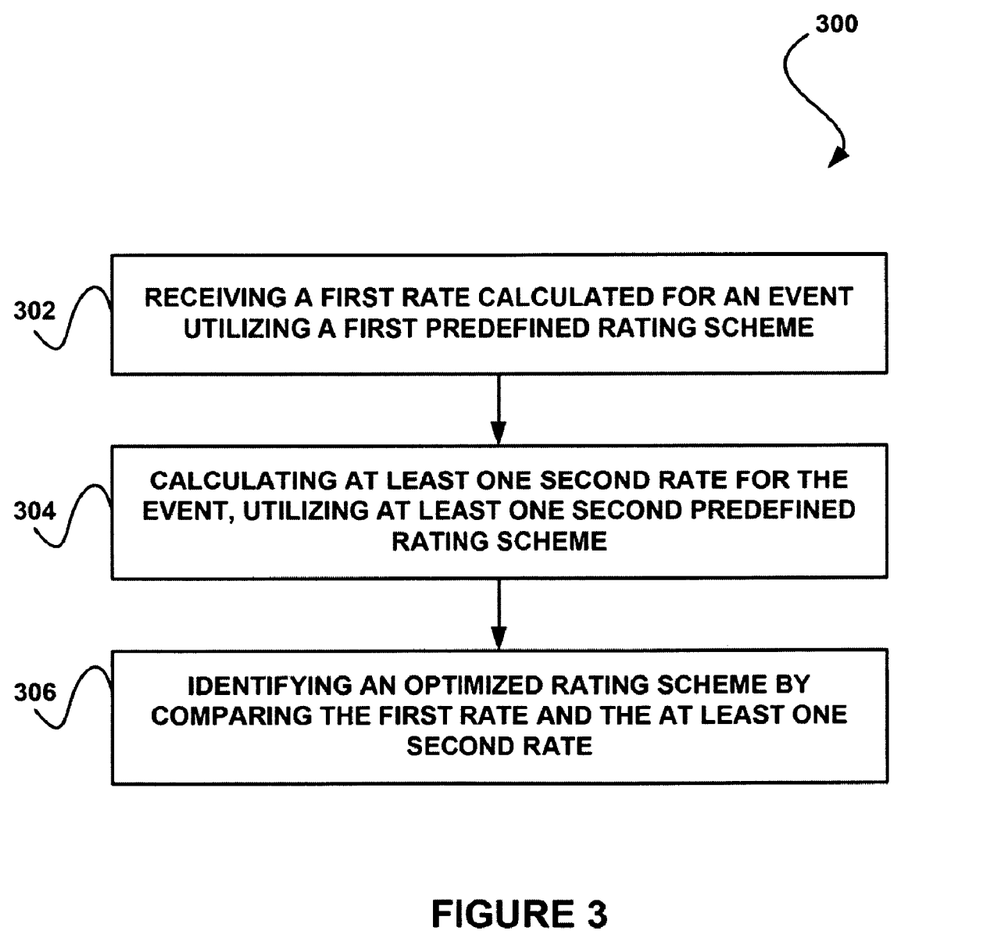
FIG. 3 illustrates a method for identifying an optimized rating scheme, in accordance with one embodiment.

FIG. 3 illustrates a method 300 for identifying an optimized rating scheme, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a first rate calculated for an event utilizing a first predefined rating scheme is identified. In the context of the present description, the event may include any initiated action. In various embodiments, the event may be initiated manually (e.g. by a user, such as a subscriber of a service) and/or automatically (e.g. by an application, etc.). For example, the event may include an initiated action capable of being rated by a service provider associated with the event (e.g. a service provider utilized for accomplishing the event, etc.), such as an electronic commerce (eCommerce) transaction, a mobile commerce (mCommerce) transaction, a micro-payment, etc.

As another example, the event may include network usage (e.g. LAN usage, wireless network usage, Internet usage, etc.). Such network usage may optionally include browsing a network, communicating over the network (e.g. transmitting a text message, etc.), etc. Additionally, the network usage may be performed by any desired device, such as any of the devices described above with respect to FIGS. 1 and/or 2.

Further, the first predefined rating scheme may include any predefined rating scheme capable of being used to calculate the first rate for the event. In one embodiment, the first predefined rating scheme may include an algorithm. In other various embodiments, the first predefined rating scheme may include a recurring charge, at least one usage rate (e.g. a price per predetermined time period of usage, etc.), a usage threshold allowance, etc.

As an option, the first predefined rating scheme may be predefined by a service provider associated with the event. For example, the service provider may provide a service which enables the event to occur. Thus, the service provider may optionally include an Internet service provider (ISP), mobile network service provider, etc.

To this end, the first rate for the event may include any value calculated utilizing the first predefined rating scheme. Just by way of example, the first rate may include output generated from the first predefined rating scheme. In one embodiment, the first rate may include a price (e.g. cost, etc.) for the event.

Still yet, the first rate may be received in any desired manner. Optionally, the first rate may be received from a first system (e.g. online platform, etc.) that calculated the first rate. In addition, the first rate may be received by a second system (e.g. offline platform, etc.) remote from the first system, such as via a network, etc. Of course, however, the first rate may be received at a first module from a second module, where the first module and the second module are within a single system, application, etc.

As also shown, at least one second rate is calculated for the event, utilizing at least one second predefined rating scheme. Note operation 304. Optionally, the second rate may be calculated utilizing the second system. Of course, as another option, the second rate may be calculated utilizing the second module.

In the context of the present description, the second predefined rating scheme may include any predefined rating scheme that is different from the first predefined rating scheme. Thus, for example, the second predefined rating scheme may include an algorithm different from the algorithm of the first predefined rating scheme. As another example, the second predefined rating scheme may include a different recurring charge, usage rate, a usage threshold allowance, etc. than the first predefined rating scheme.

In one embodiment, the second predefined rating scheme may be associated with the same service provider as the first predefined rating scheme. In another embodiment, the second predefined rating scheme may be associated with a different service provider than the first predefined rating scheme. Accordingly, the second rate for the event may include any value (e.g. price, etc.) calculated utilizing the second predefined rating scheme. To this end, a first rate and a second rate may be calculated for the event utilizing different predefined rating schemes.

Moreover, an optimized rating scheme is identified by comparing the first rate and the at least one second rate, as shown in operation 306. With respect to the present description, the optimized rating scheme may include a selection of the first predefined rating scheme or the second predefined rating scheme, based the comparison of the first rate and the second rate. Thus, the optimized rating scheme may include the first predefined rating scheme or the second predefined rating scheme.

In one embodiment, the optimized rating scheme may include one of the first predefined rating scheme and the second predefined rating scheme which provides an optimal rate. In another embodiment, the optimal rate may be identified based on the comparison of the first rate and the second rate. Just by way of example, the optimal rate may include a lowest rate. Thus, the first predefined rating scheme may be selected as the optimized rating scheme if it is determined that the first rate is less than the second rate, based on the comparison. In another embodiment, the second predefined rating scheme may be selected as the optimized rating scheme if it is determined that the second rate is less than the first rate, based on the comparison.

As an option, the at least one second rate may include multiple calculated rates. For example, each of the second rates may be calculated utilizing a different second predefined rating scheme. To this end, the optimized rating scheme may be identified by comparing the first rate and multiple second rates, in one optional embodiment.

In this way, an optimal rating scheme for the event may be identified in response to the event. Further, a user that initiated the event may accordingly be billed for the event based on an optimal rate for the event calculated utilizing the optimal rating scheme. Still yet, such optimal rate may be determined at any time during a billing cycle, thus allowing a rating scheme applied to user events to dynamically change.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
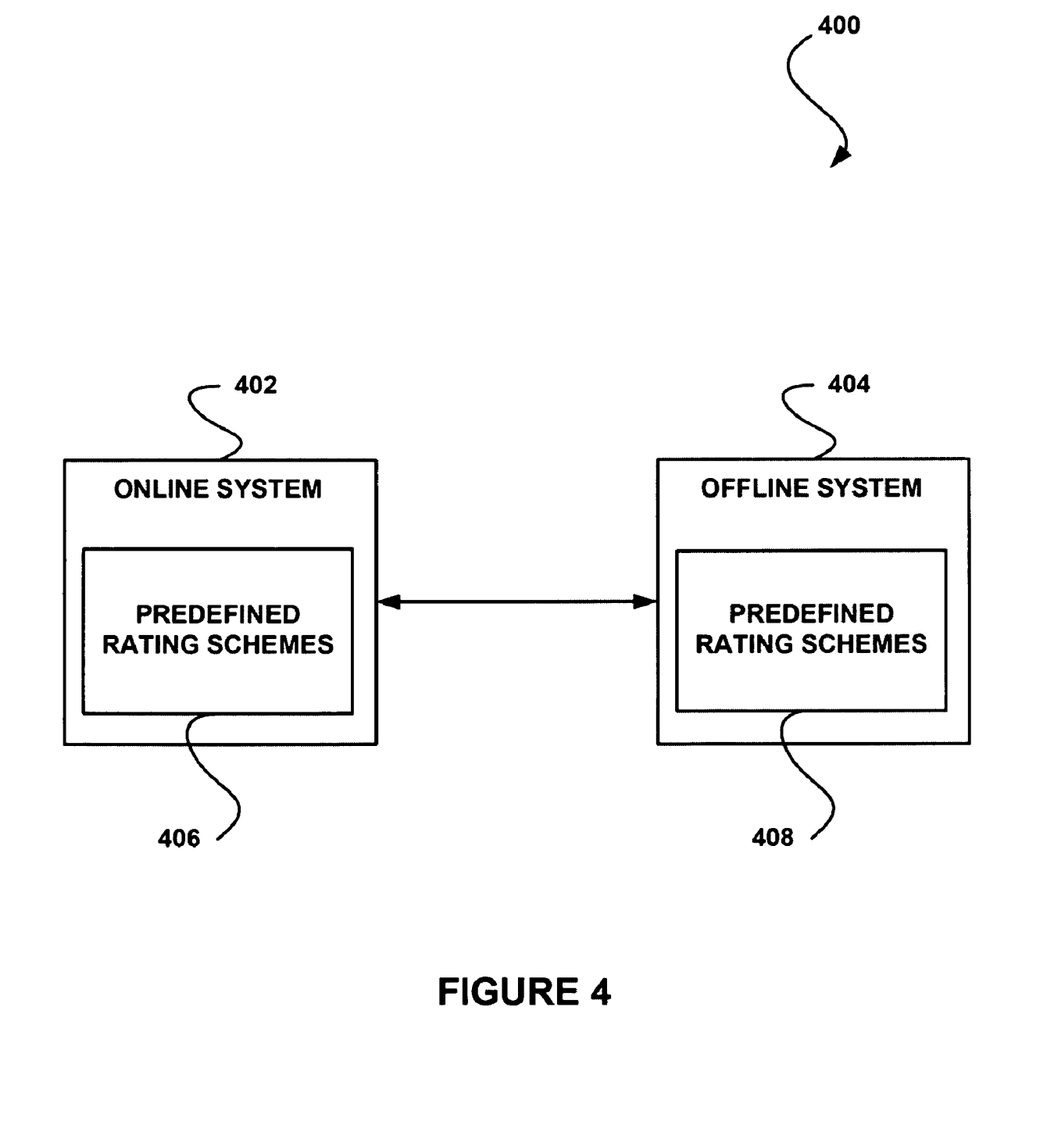
FIG. 4 illustrates a system for identifying an optimized rating scheme, in accordance with another embodiment.

FIG. 4 illustrates a system 400 for identifying an optimized rating scheme, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, an online system 402 is in communication with an offline system 404. In one embodiment, the online system 402 and the offline system 404 may include separate devices (e.g. such as any of the devices described above with respect to FIGS. 1 and/or 2) in communication via a network (e.g. Internet, LAN, etc.). In another embodiment, the online system 402 and the offline system 404 may include modules within a single device, application, etc. that are in communication via logic of such single device.

In one embodiment, the online system 402 may include an online platform. As an option, the online system 402 may identify events in response to initiation, completion, etc. of such events. As another option, the online system 402 may be utilized (e.g. by a user, etc.) for initiating the events. Just by way of example, the online system 402 may include a wireless device capable of sending text messages.

Additionally, the online system 402 may include predefined rating schemes 406. The predefined rating schemes 406 may be capable of being utilized by the online system 402 for rating events. For example, each predefined rating scheme 406 may include an algorithm for calculating a rate for an event identified by the online system 402. While the online system 402 is shown, it should be noted that an offline system including an offline platform may also be utilized with respect to such online system 402.

In another embodiment, the offline system 404 may include an offline platform. The offline platform may include a central server, for example. Optionally, the offline platform may be dedicated to identifying optimized rating schemes for events, as set forth below in more detail.

The offline system 404 also includes predefined rating schemes 408. In one embodiment, the predefined rating schemes 408 of the offline system 404 may be the same as the predefined rating schemes 406 of the online system 402. Thus, the predefined rating schemes 406 of the online system 402 may optionally be synchronized with the predefined rating schemes 408 of the offline system 404. For example, the offline system 404 may send updated predefined rating schemes to the online system 402.

In one embodiment, the online system 402 may identify an event associated with the online system 402 (e.g. performed utilizing the online system 402, etc.). Just by way of example, the event may include a text message sent from the online system 402. Optionally, the online system 402 may identify the event utilizing a module that monitors events (e.g. predefined types of events, etc.) associated with the online system 402.

The online system 402 may further calculate a first rate for the event utilizing one of the predefined rating schemes 406 of the online system 402. In one embodiment, the online system 402 may select one of the predefined rating schemes 406 for calculating the first rate for the event. For example, each of the predefined rating schemes 406 may be assigned a different priority. Such priorities may be predefined (e.g. by an administrator, the service provider, etc.), as an option. Just by way of example, the priorities may be predefined according to a recurring charge associated with each predefined rating scheme 406 (e.g. the predefined rating scheme 406 with the lowest recurring charge may be assigned a highest priority, and so forth).

To this end, the online system 402 may select one of the predefined rating schemes 406 for calculating the first rate for the event based on the priorities of such predefined rating schemes 406. As an option, the online system 402 may select a predefined rating scheme 406 with a highest priority. Of course, however, the online system 402 may select one of the predefined rating schemes 406 of the online system 402 for calculating the first rate in any desired manner.

Upon selection of one of the predefined rating schemes 406, the online system 402 may accordingly calculate a first rate for the event utilizing such selected predefined rating scheme 406. In one embodiment, the first rate may include a price for the event. For example, the price may be billed to a user of the online system 402 for initiating the event. Optionally, the online system 402 may store information regarding the event in a queue prior to calculating the first rate.

Still yet, the online system 402 may communicate the first rate and the event to the offline system 404 (e.g. over a network, etc.). In one embodiment, the first rate may be sent to the offline system 404 with the event. Of course, however, the first rate may also be sent to the offline system 404 separate from the event. As another option, the first rate and the event may be sent to the offline system 404 utilizing an emit event function. Accordingly, the offline system 404 may receive the first rate and the event.

In response to receipt of the first rate and the event, the offline system 404 may calculate a second rate for the event utilizing one of the predefined rating schemes 408 of the offline system 404 that is different from the predefined rating scheme 406 of the online system 402 utilized for calculating the first rate. Optionally, each of the predefined rating schemes 408 of the offline system 404 may be assigned a different priority. Such priorities may be predefined (e.g. by an administrator, the service provider, etc.), as an option. As another option, the priorities for each of the predefined rating schemes 408 of the offline system 404 may be the same as the priorities for each of the predefined rating schemes 406 of the online system 402.

To this end, the offline system 404 may select one of the predefined rating schemes 408 for calculating the second rate for the event based on the priorities of such predefined rating schemes 408. As an option, the offline system 404 may select a predefined rating scheme 408 with a priority next highest with respect to the priority of the predefined rating scheme 406 utilized by the online system 402 to calculate the first rate. Thus, if the online system 402 calculated the first rate utilizing a predefined rating scheme 406 with a highest priority, the offline system 404 may calculate the second rate utilizing a predefined rating scheme 408 with a second highest priority. Of course, however, the offline system 404 may select one of the predefined rating schemes 408 of the offline system 404 for calculating the second rate in any desired manner.

Upon selection of one of the predefined rating schemes 408 of the offline system 404, the offline system 404 may calculate the second rate for the event utilizing the selected predefined rating scheme 408. In one embodiment, the second rate may include a price for the event. For example, the price may be billed to a user of the online system 402 for initiating the event. Optionally, the offline system 404 may store information regarding the event in a queue prior to calculating the second rate.

Moreover, the offline system 404 may compare the first rate and the second rate for identifying an optimized rating scheme. In one embodiment, the optimized rating scheme may include the predefined rating scheme 406 utilized to calculate the first rate or the predefined rating scheme 408 utilized to calculate the second rate based on which provides an optimal rate. Thus, for example, the predefined rating scheme 406 utilized to calculate the first rate may be selected as the optimized rating scheme if it is determined that the first rate is less than the second rate, based on the comparison. In another embodiment, the predefined rating scheme 408 utilized to calculate the second rate may be selected as the optimized rating scheme if it is determined that the second rate is less than the first rate, based on the comparison.

As an option, if the predefined rating scheme 408 utilized to calculate the second rate is identified as the optimal rating scheme, the offline system 404 may communicate a message to the online system 402. In one embodiment, the message may instruct the online system 402 to utilize the predefined rating scheme 408 of the offline system 404 for rating the event. Thus, the user of the offline system 404 may be billed for the event based on the second rate provided via the predefined rating scheme 408 of the offline system 404.

As another option, the message may also instruct the online system 402 to change the priorities associated with the predefined rating schemes 406 of the online system 402. Just by way of example, the message may instruct the online system 402 to switch the priorities assigned to the predefined rating scheme 406 utilized to calculate the first rate and the predefined rating scheme 408 utilized to calculate the second rate. In this way, the identified optimized rating scheme may be assigned the highest priority, in one embodiment. Of course, it should be noted that the offline system 404 may also change the priorities associated with the predefined rating schemes 408 of the offline system 404 in the same manner.

As yet another option, the message may include an amount to be subtracted from a prepaid account. For example, the amount may include a rate for the event calculated utilizing the optimized rating scheme. In this way, the online system 402 may update a prepaid account to reflect a charge for the event.

Table 1 illustrates one example of identifying an optimized rating scheme for various events utilizing the online system 402 and the offline system 404. It should be noted that such example is set forth for illustrative purposes only, and thus should not be construed as limiting in any manner.

| Event ID | Online System | Offline System |
|---|---|---|
| 1 | Rates the event as per "Regular" rating scheme, send the event along with accumulated cost (including recurring charge) & the priority identifier related to "Regular" scheme to offline system using "Emit" event mechanism | Rates the event using "F&F" and "High Usage" rating schemes which are priority 2 & 3 respectively. Calculate the accumulated cost for each and compare the cost with that from the online system. If the cost calculated for the "Regular" rating scheme is lower than the costs calculated for the F&F and "High Usage" rating schemes, event is rated with Regular" rating scheme for billing purposes. |
| ... | ... | ... |
| 40 | Rate the event as per "Regular" rating scheme which has the highest priority, send the event along with accumulated cost & the priority identifier related to "Regular" scheme to offline system | Rate the event using "F&F" and "High Usage" rating schemes which are priority 2 & 3 respectively. Calculate the accumulated cost for each and compare the cost with that from the online system. If the cost is lower when the event is rated using the "High Usage" rating scheme, send a request to the online system to reset the priorities of the pricing schemes ("High Usage" now gets priority 1) and also sends the priority identifier for the "High Usage" rating scheme to the online system. In the case of pre-paid scenario, it also sends the delta amount of usage cost to the online system. |
| 40 | Online system resets the priority identifier for the "Regular" rating scheme with the priority identifier related to "High Usage" received from the offline system. It also resets the priorities of the other rating schemes accordingly. In the pre-paid scenario, it updates the balance by adding the delta amount. | |
| 41 | Rates the event as per "High Usage" rating scheme as this has the highest priority now. It sends the accumulated cost and priority identifier for the "High Usage" rating scheme to the offline system. | Rates the event using "Regular" and "F&F" rating schemes which are priority 2 & 3 respectively. Calculate the accumulated cost for each and compare the cost with that from the online platform. If the cost is lower on online platform, the event is rated with Regular" rating scheme for billing purposes. |
| ... | ... | ... |

The process shown in Table 1 may continue until a last event within a billing cycle is identified. The lowest rate associated with the last event may be identified and the associated rating scheme may be used for billing purposes. To this end, an optimized rating scheme may be identified automatically, without necessarily utilizing administrator and/or user decision-making.

To this end, an optimized rating scheme may be identified as each event within a billing cycle is identified, thus providing near real-time dynamic changes to predefined rating schemes utilized to rate events for accurate calculations of event rates. In addition, credit and budget control may be provided accurately thereby minimizing risk to both the user and service provider. Further, the optimized rating scheme may be identified for an event associated with a subscriber of a prepaid service, a postpaid service, or a service charged in part to a prepaid account and in part to a postpaid account. Still yet, an impact of recurring charges may be considered during calculation of rates for identifying the optimizing rating scheme, and furthermore the optimizing rating scheme may be identified based on all parameters of complex rating schemes (e.g. preferred phone numbers, user-defined peak/off-peak period, closed user group phone numbers, etc.

Figure 5:
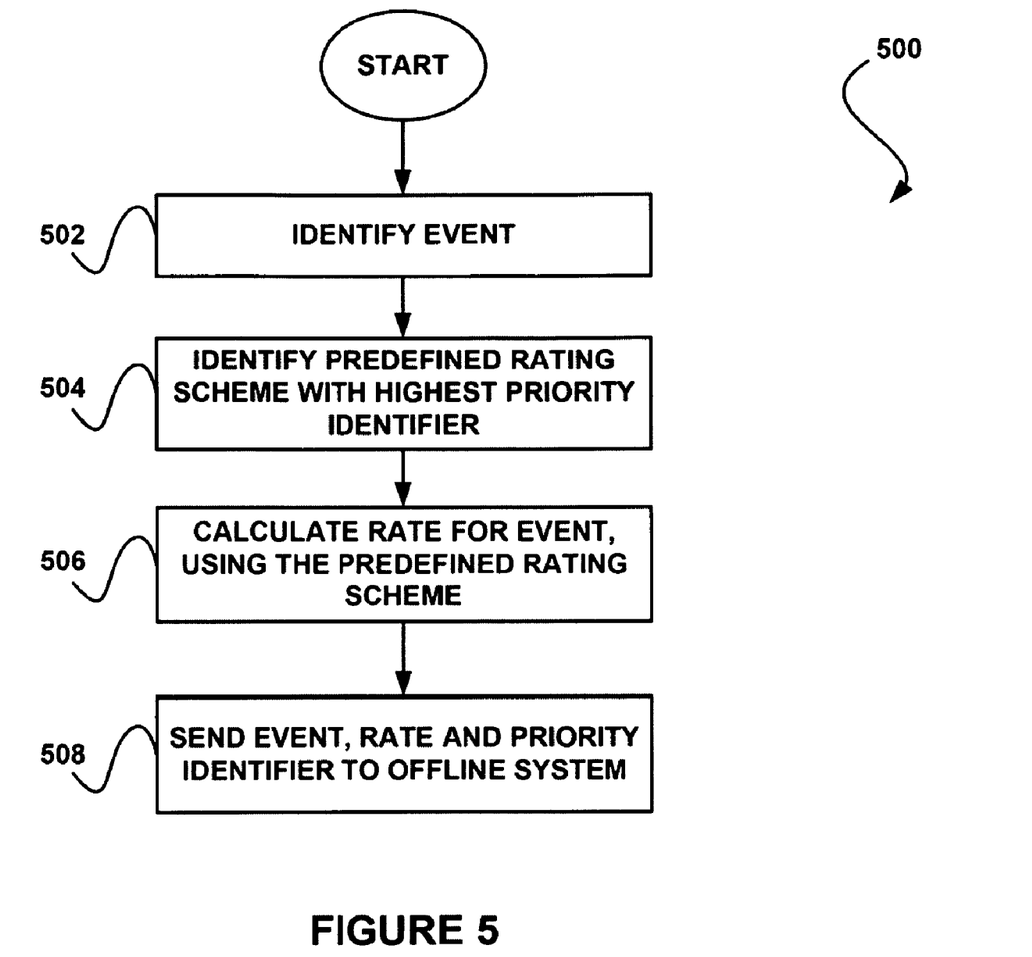
FIG. 5 illustrates a method for calculating a rate for an event utilizing a predefined rating scheme with a highest priority identifier, in accordance with yet another embodiment.

FIG. 5 illustrates a method 500 for calculating a rate for an event utilizing a predefined rating scheme with a highest priority identifier, in accordance with yet another embodiment. As an option, the method 500 may be carried out in the context of the details of FIGS. 1-4. Just by way of example, the method 500 may be carried out utilizing the online system 402 of FIG. 4. Of course, however, the method 500 may be carried out in any desired environment. Again, the aforementioned definitions may equally apply to the description below.

As shown in operation 502, an event is identified. In one embodiment, the event may be identified in response to initiation of the event. For example, the event may be identified by monitoring a system for events.

Additionally, a predefined rating scheme with a highest priority identifier is identified, as shown in operation 504. For example, a predefined rating scheme assigned a highest priority may be identified. As an option, the predefined rating scheme may be stored in a data structure with a plurality of other predefined rating schemes, in which each rating scheme is associated with a different priority identifier.

Further, a rate for the event is calculated, using the predefined rating scheme, as shown in operation 506. In one embodiment, the predefined rating scheme may be applied to the event for calculating a rate for the event. In another embodiment, characteristics of the event may be input into the predefined rating scheme for calculating a rate of the event. Just by way of example, such characteristics may include a time of the event, a length in time of the event, a memory size of the event, etc.

As an option, calculating the rate for the event may be based on the event in addition to previous events (e.g. within a current billing cycle, etc.). For example, such previous events may include events that previously occurred on the same system as the identified event. Just by way of example, the predefined rating scheme may include as input the previous events. In this way, the rate for the event may optionally include a total rate for events accumulated within a single billing cycle, for example.

Still yet, the event, rate and priority identifier are sent to an offline system. Note operation 508. In one embodiment, the event, rate and priority identifier may be sent in combination, but of course in another embodiment may also be sent separately. In yet another embodiment, the event, rate and priority identifier may be sent via a message.

Figure 6:
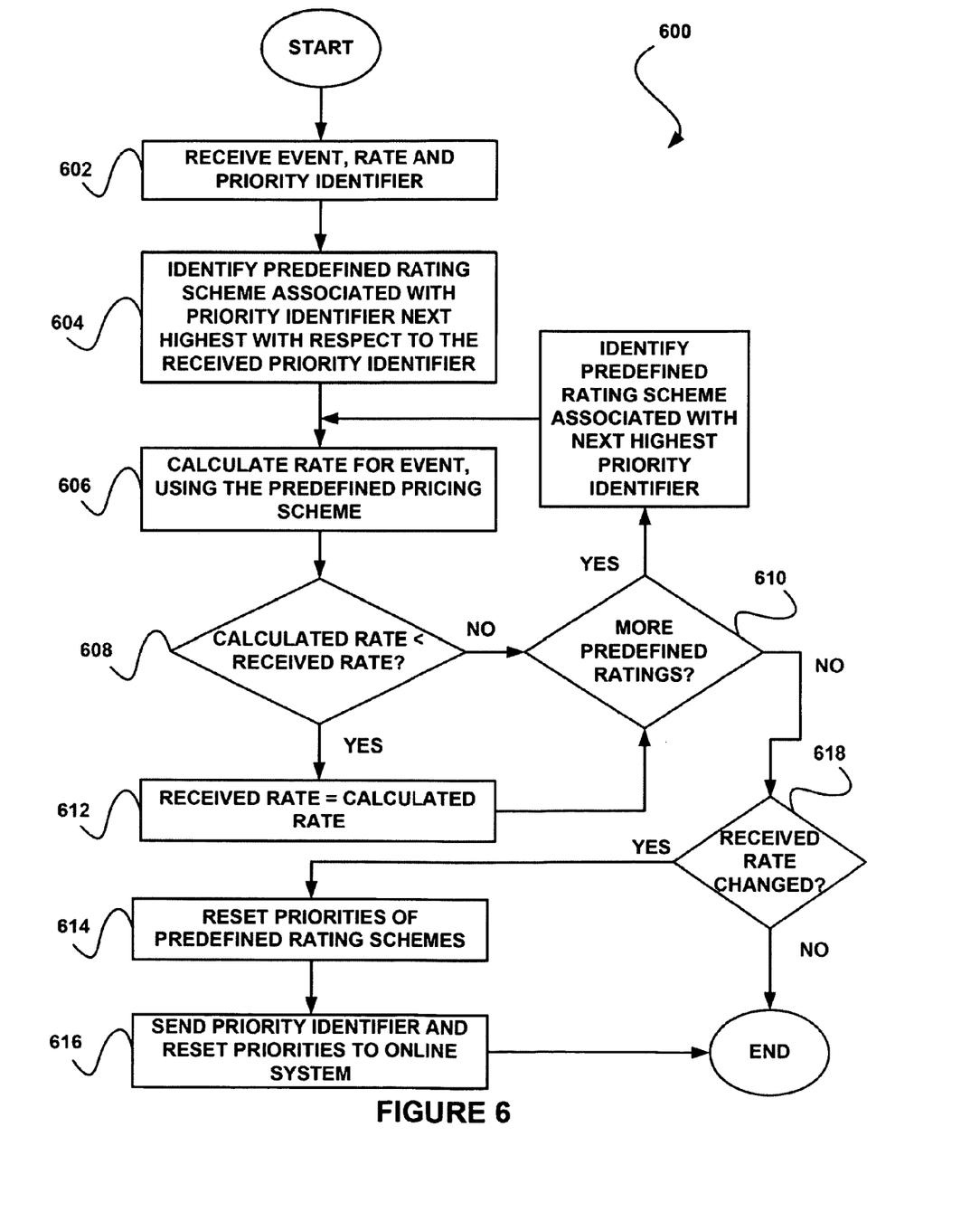
FIG. 6 illustrates a method for calculating a rate for an event utilizing a predefined rating scheme with a next highest priority identifier, in accordance with still yet another embodiment.

FIG. 6 illustrates a method 600 for calculating a rate for an event utilizing a predefined rating scheme with a next highest priority identifier, in accordance with still yet another embodiment. As an option, the method 600 may be carried out in the context of the details of FIGS. 1-5. Just by way of example, the method 600 may be carried out utilizing the offline system 404 of FIG. 4. Of course, however, the method 600 may be carried out in any desired environment. Yet again, the aforementioned definitions may equally apply to the description below.

As shown in operation 602, an event, rate and priority identifier are received. In one embodiment, the event, rate and priority may be received from a system which calculated the rate for the event utilizing a predefined rating scheme associated with the priority identifier. Thus, the priority identifier may indicate the predefined rating scheme utilized to calculate the rate.

Additionally, a predefined rating scheme associated with a priority identifier next highest with respect to the received priority identifier is identified. Note operation 604. In this way, a predefined rating scheme assigned a priority next highest with respect to the received priority identifier may be identified. Further, a rate for the event is calculated, using the predefined pricing scheme, as shown in operation 606.

As also shown, it is determined whether the calculated rate is less than the received rate. Note decision 608. Thus, the calculated rate may be compared to the received rate for determining which rate is larger. If it is determined that the calculated rate is less than the received rate, the received rate is adjusted to reflect the calculated rate. Note operation 612. Thus, the received rate may include the calculated rate. Of course however, the calculated rate may be stored in any accessible manner. Further, it is determined whether more predefined rating schemes exist. Note decision 610.

Similarly, if it is determined that the calculated rate is not less than the received rate, it is determined whether more predefined rating schemes exist. Note decision 610. For example, a data structure storing a plurality of predefined rating schemes may be searched for at least one other predefined rating scheme.

In response to a determination that more predefined rating schemes exist, a predefined rating scheme associated with a next highest priority identifier is identified, as shown in operation 611. Thus, a predefined rating scheme assigned a priority next highest with respect to the last identified predefined rating scheme (in operation 604) may be identified. Accordingly, a new rate may be calculated from the predefined rating scheme identified in operation 611 for determining whether such new rate is less than the rate received in operation 602.

If, however, it is determined in decision 610 that more predefined rating schemes do not exist, it is determined whether the received rate has changed. Note decision 618. In the context of the present embodiment, the received rate may have changed if it is determined that the received rate is greater than a calculated rate (see operation 612). In response to a determination that the received rate has not changed, the method 600 is terminated. Thus, the received rate may be utilized for billing a user associated with the event, in one embodiment.

However, in response to a determination that the received rate has changed, priorities of the predefined rating schemes are reset, as shown in operation 614. For example, a predefined rating scheme providing a lowest calculated rate for the event may switch priority identifiers with the predefined rating scheme associated with the received priority identifier (of operation 602). Thus, the predefined rating scheme providing the lowest calculated rate may be assigned a highest priority.

Further, the new highest priority identifier and the reset priorities are sent to an online system from which the event, rate and priority identifier were received in operation 602. In this way, the online system may reset the priority identifiers of predefined rating schemes associated with (e.g. stored on, etc.) such online system. In addition, the online system may utilized the new highest priority identifier for rating the event (e.g. for billing purposes, etc.).

Figure 7:
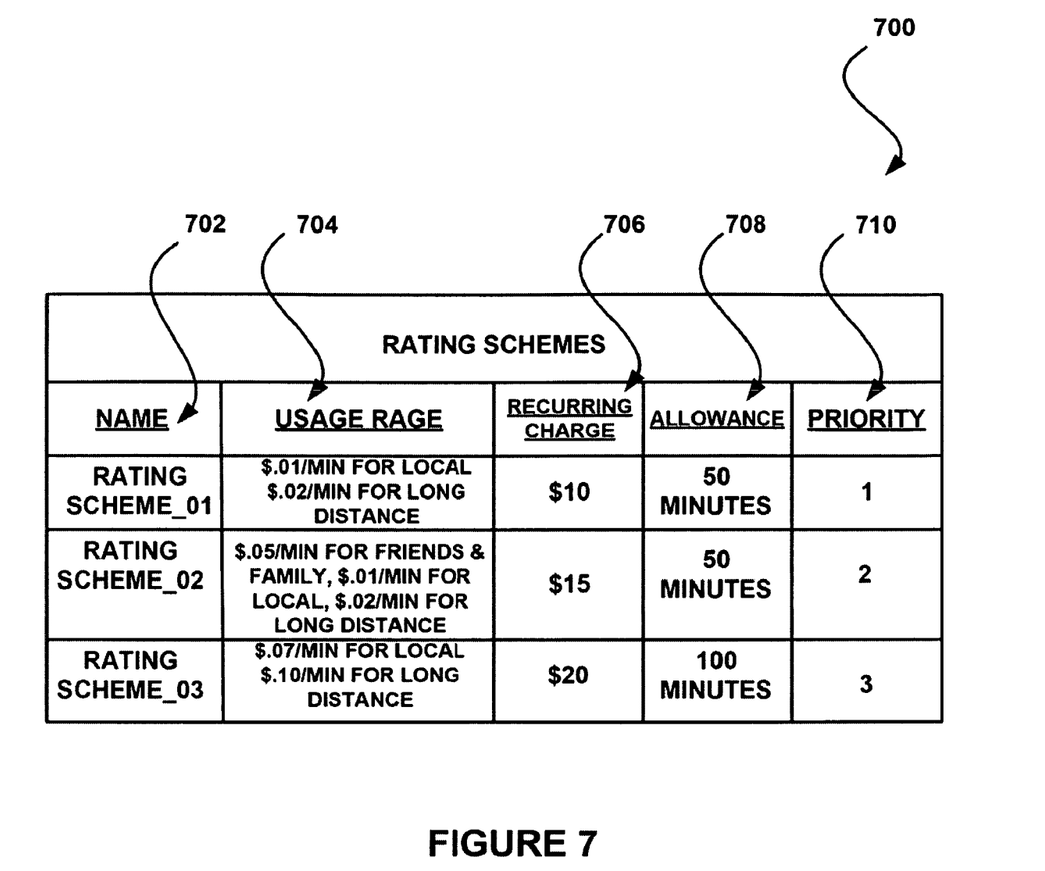
FIG. 7 illustrates a data structure for storing a plurality of rating schemes and associated priority identifiers, in accordance with another embodiment.

FIG. 7 illustrates a data structure 700 for storing a plurality of rating schemes and associated priority identifiers, in accordance with another embodiment. As an option, the data structure 700 may be implemented in the context of the details of FIGS. 1-6. Just by way of example, the data structure 700 may be implemented for storing the predefined rating schemes 406 and 408 of FIG. 4. Of course, however, the data structure 700 may be implemented in any desired environment. Further, the aforementioned definitions may equally apply to the description below.

As shown, the data structure 700 includes a plurality of predefined rating schemes 702. Further, each predefined rating scheme includes at least one usage rate 704. In the context of the present embodiment, the usage rate may include any rate for a predetermined time period (e.g. rate per minute, etc.) that is associated with usage of a service (e.g. network service, etc.). A different usage rate may be provided for local usage, long distance usage, usage within a preferred network of devices (e.g. friends and family), etc.

Additionally, each predefined rating scheme 702 includes a recurring charge 706. The recurring charge may include predetermined charged for each billing cycle, for example. Optionally the recurring charge may be independent of any calculated usage rate 704.

Still yet, each predefined rating scheme 702 includes a usage allowance 708. The usage allowance 708 may indicate a maximum allowable usage associated with the predefined rating scheme 702. Just by way of example, network usage allowed by a particular predefined rating scheme 702 may be limited to a predetermined number of minutes. As also shown, each predefined rating scheme 702 is assigned a different priority 710. The priorities may be predetermined (e.g. by an administrator, automatically based on specific criteria, etc.), in one embodiment.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
 receiving at a second system including an offline platform a first rate calculated for a single event by a first system other than the second system, the first system including an online platform utilizing a first predefined rating scheme, where the first predefined rating scheme is associated with a first priority;
 calculating, utilizing a processor, at least one second rate for the single event by the second system including the offline platform, the calculating utilizing at least one second predefined rating scheme, where the at least one second predefined rating scheme is associated with at least one other priority;
 identifying an optimized rating scheme by comparing the first rate and the at least one second rate; and
 communicating a message to the first system including the online platform if one of the at least one second rate for the single event calculated utilizing the at least one second predefined rating scheme is identified as the optimized rating scheme, the message instructing the first system including the online platform to utilize the at least one second predefined rating scheme of the second system including the offline platform identified as the optimized rating scheme for calculating an optimized rate for the single event as well as rates of future events at the first system including the online platform, the optimized rate including an amount to be billed for the single event;

wherein the second system including the offline platform sends updated predefined rating schemes to the first system including the online platform for synchronizing predefined rating schemes of the first system including the online platform with predefined rating schemes of the second system including the offline platform;

wherein the second predefined rating scheme is associated with a same service provider as the first predefined rating scheme;

wherein the first rate is calculated and sent to the second system by the first system for each of a plurality of single events in response to the identification of each of the plurality of single events by the first system, such that the optimized rating scheme is identified for each of the plurality of single events as each single event is received.

2. The method of claim 1, wherein the single event includes transmission of a text message.

3. The method of claim 1, wherein the single event includes network usage.

4. The method of claim 1, wherein at least one of the first rate and the at least one second rate includes a price for the single event.

5. The method of claim 1, wherein the single event is communicated over a network by the first system to the second system for calculation of the at least one second rate.

6. The method of claim 1, wherein the second system identifies the optimized rating scheme.

7. The method of claim 1, wherein at least one of the first predefined rating scheme and the at least one second predefined rating scheme includes a recurring charge.

8. The method of claim 1, wherein the first priority and the at least one other priority are predefined.

9. The method of claim 1, further comprising changing the first priority and the at least one other priority if the at least one second rate is less than the first rate.

10. The method of claim 1, wherein identifying the optimized rating scheme includes selecting the first predefined rating scheme if the first rate is less than the at least one second rate.

11. The method of claim 1, wherein the single event is associated with a subscriber of one of a prepaid service, a postpaid service or a service charged in part to a prepaid account and in part to a postpaid account.

12. A computer program product embodied on a computer readable medium executed by a processor, comprising:

computer code for receiving at a second system including an offline platform a first rate calculated for a single event by a first system other than the second system, the first system including an online platform utilizing a first predefined rating scheme, where the first predefined rating scheme is associated with a first priority;

computer code for calculating at least one second rate for the single event by the second system including the offline platform, the calculating utilizing at least one second predefined rating scheme, where the at least one second predefined rating scheme is associated with at least one other priority;

computer code for identifying an optimized rating scheme by comparing the first rate and the at least one second rate; and computer code for communicating a message to the first system including the online platform if one of the at least one second rate for the single event calculated utilizing the at least one second predefined rating scheme is identified as the optimized rating scheme, the message instructing the first system including the online platform to utilize the at least one second predefined rating scheme of the second system including the offline platform identified as the optimized rating scheme for calculating a optimized rate for the single event as well as rates of future events at the first system including the online platform, the optimized rate including an amount to be billed for the single event;

wherein the second system including the offline platform sends updated predefined rating schemes to the first system including the online platform for synchronizing predefined rating schemes of the first system including the online platform with predefined rating schemes of the second system including the offline platform;

wherein the second predefined rating scheme is associated with a same service provider as the first predefined rating scheme;

wherein the first rate is calculated and sent to the second system by the first system for each of a plurality of single events in response to the identification of each of the plurality of single events by the first system, such that the optimized rating scheme is identified for each of the plurality of single events as each single event is received.

13. A system, comprising:

a processor for:

receiving at a second system including an offline platform a first rate calculated for a single event by a first system other than the second system, the first system including an online platform utilizing a first predefined rating scheme, where the first predefined rating scheme is associated with a first priority;

calculating at least one second rate for the single event by the second system including the offline platform, the calculating utilizing at least one second predefined rating scheme, where the at least one second predefined rating scheme is associated with at least one other priority;

identifying an optimized rating scheme by comparing the first rate and the at least one second rate; and communicating a message to the first system including the online platform if one of the at least one second rate for the single event calculated utilizing the at least one second predefined rating scheme is identified as the optimized rating scheme, the message instructing the first system including the online platform to utilize the at least one second predefined rating scheme of the second system including the offline platform identified as the optimized rating scheme for calculating a optimized rate for the single event as well as rates of future events at the first system including the online platform, the optimized rate including an amount to be billed for the single event;

wherein the second system including the offline platform sends updated predefined rating schemes to the first system including the online platform for synchronizing predefined rating schemes of the first system including the online platform with predefined rating schemes of the second system including the offline platform;

wherein the second predefined rating scheme is associated with a same service provider as the first predefined rating scheme;

wherein the first rate is calculated and sent to the second system by the first system for each of a plurality of single events in response to the identification of each of the plurality of single events by the first system, such that the optimized rating scheme is identified for each of the plurality of single events as each single event is received.

14. The system of claim 13, wherein the processor is coupled to memory via a bus.

15. A method, comprising:

calculating, utilizing a processor, a first rate for a single event by a first system including an online platform, the calculating utilizing a first predefined rating scheme, the first predefined rating scheme associated with a first priority;

sending the single event and the first rate to a second system other than the first system for calculation of at least one second rate for the single event by the second system including an offline platform, where the calculation of the at least one second rate utilizes at least one second predefined rating scheme, and where the at least one second predefined rating scheme is associated with at least one other priority; and receiving a message at the first system including the online platform if one of the at least one second rate for the single event calculated utilizing the at least one second predefined rating scheme is identified as an optimized rating scheme, the message instructing the first system including the online platform to utilize the at least one second predefined rating scheme of the second system including the offline platform identified as the optimized rating scheme for calculating a optimized rate for the single event as well as rates of future events at the first system including the online platform, the optimized rate including an amount to be billed for the single event;

wherein the optimized rating scheme is identified by comparing the first rate and the at least one second rate;

wherein the second system including the offline platform sends updated predefined rating schemes to the first system including the online platform for synchronizing predefined rating schemes of the first system including the online platform with predefined rating schemes of the second system including the offline platform;

wherein the second predefined rating scheme is associated with a same service provider as the first predefined rating scheme;

wherein the first rate is calculated and sent to the second system by the first system for each of a plurality of single events in response to the identification of each of the plurality of single events by the first system, such that the optimized rating scheme is identified for each of the plurality of single events as each single event is received.

16. The method of claim 1, wherein the first predefined rating scheme for calculating the first rate is selected based on priorities of the predefined rating schemes, such that the online platform selects the first predefined rating scheme associated with the first priority because the first priority is a highest priority of the priorities of the predefined rating schemes.

17. The method of claim 1, wherein the online platform identifies the single event in response to an initiation of the single event.

18. The method of claim 1, wherein the online platform identifies the single event in response to a completion of the single event.

19. The method of claim 8, wherein the first priority associated with the first predetermined rating scheme and the at least one other priority associated with the at least one second predetermined rating scheme are predefined according to a recurring charge associated with each predetermined rating scheme.

20. The method of claim 16, wherein the offline platform selects a predefined rating scheme with a priority next highest to the highest priority of the predefined rating scheme utilized by the online platform to calculate the first rate.

21. The method of claim 1, wherein the message further instructs the online platform to change priorities associated with the predefined rating schemes of the online platform.

22. The method of claim 21, wherein the message further instructs the online platform to switch the first priority associated with the predefined rating scheme utilized to calculate the first rate with the at least one other priority associated with the predefined rating scheme utilized to calculate the optimized rate.

* * * * *